United States Patent [19]
Park

[11] Patent Number: 5,903,779
[45] Date of Patent: May 11, 1999

[54] SYSTEM AND METHOD FOR EFFICIENT PACKING DATA INTO AN OUTPUT BUFFER

[75] Inventor: Heon-Chul Park, Ansan-shi, Rep. of Korea

[73] Assignee: Samsung Electronics, Co., Ltd., Suwon, Rep. of Korea

[21] Appl. No.: 08/751,356

[22] Filed: Nov. 18, 1996

[30] Foreign Application Priority Data

Nov. 17, 1995 [KR] Rep. of Korea ............... 95-41906

[51] Int. Cl.⁶ .................. G06F 9/00; G06F 13/00
[52] U.S. Cl. .................. 395/898; 395/561; 395/564; 395/800.04; 395/800.06; 395/800.16
[58] Field of Search ............... 395/898, 800.01, 395/800.02, 800.04, 800.06, 800.07, 800.1, 800.11, 800.16, 561–564, 800

[56] References Cited

U.S. PATENT DOCUMENTS

| | | | |
|---|---|---|---|
| 5,107,415 | 4/1992 | Sato et al. ................. | 395/898 |
| 5,400,087 | 3/1995 | Uramoto et al. ............. | 348/699 |
| 5,423,010 | 6/1995 | Mizukami .................. | 341/60 |
| 5,446,482 | 8/1995 | Van Aken et al. ............ | 345/199 |
| 5,560,030 | 9/1996 | Guttag et al. .............. | 395/800.16 |
| 5,594,919 | 1/1997 | Turkowski ................. | 395/898 |
| 5,819,117 | 10/1998 | Hansen .................... | 395/898 |

*Primary Examiner*—Parshotam S. Lall
*Assistant Examiner*—Bharat Barot
*Attorney, Agent, or Firm*—Marger Johnson & McCollom, P.C.

[57] ABSTRACT

Vector data buffer apparatus for interfacing processor bus and register having different word sizes. The vector data buffer includes a word buffer for positioning data words into any desired position by rotation or reverse loading. Endian buffer further provides byte rotation and selectable endian word formation. Latches and selection multiplexers provided for shifting bytes into a wide register to effect register access with only a single processor I/O operation for improved performance of the processor.

13 Claims, 2 Drawing Sheets

000: 0-WORD ROTATE
001: 1-WORD ROTATE
010: 2-WORD ROTATE
011: 3-WORD ROTATE
100: REVESE LOADING

000:0-byte shift
001:1-byte shift
010:2-byte shift
011:3-byte shift
100:big endian word
101:big endian halfword
110:big endian halfword w/2byte shift
111:big endian halfword w/reverse

SYSTEM AND METHOD FOR EFFICIENT PACKING DATA INTO AN OUTPUT BUFFER

FIELD OF THE INVENTION

The present invention relates to digital processor architectures, and, more specifically, to a methods and apparatus for processing vector data in order to reduce the number of accesses to a register, thereby improving the overall performance of a digital processor.

SUMMARY OF THE PRIOR ART

Generally, digital processors include registers for temporary storage of intermediate results, an arithmetic logic unit (ALU) for performing arithmetic operations in a controller for controlling operation of the processor overall, for the general purpose of processing various digital data.

In some systems, there can be a mismatch between the internal word size, i.e., the ALU word size, the size of the registers, and the bus width. For example, some machines operate on 32-bit numeric quantities, but the memory is only 8-bits wide. In that case, the quantities to be processes must be broken up into four 8-bit pieces, or bytes, to be stored in the memory.

In another example, described in detail herein, a processor or ALU word size is 36 bits, the register size is 288 bits, and the bus width is 144 bits. In these situations, multiple input/output or bus transfer operations are necessary to deal with the mismatch in word size. For example, it would take two bus access operations to read or write a register of 288 bits where the bus is only 144 bits wide. Similarly, a 36-bit word size ALU would have to access the register or register file port eight times in order to transfer a 288-bit wide operand. Thus, much of the ALU power (i.e., many of its operating cycles) are dedicated to transferring operands as described.

Mismatches in word size can arise when the operands are greater than the internal word size, or greater than the bus size, or when a memory address exceeds the bus size, etc. What is needed is to reduce the number of ALU accesses to the register, to free up the ALU for performing arithmetic operations, thereby improving the performance of the processor as a whole.

SUMMARY OF THE INVENTION

According to one aspect of the invention, word buffer logic rotates or shifts each input word into a selected position. It provides, in other words, rotation or reverse loading of the input data on a word unit basis. The result is input to endian buffer logic comprising a series of multiplexers. Each endian multiplexer receives each of first to fourth bytes of the of the word applied from the word buffer logic. The endian multiplexers shift the bytes or form the endian word in accordance with the state of three bits applied from the word buffer logic. The resulting endian word is latched into a series of buffers arranged so as to allow selection of the endian words and bytes in a desired sequence for clocking them out, for example to write into a register wider than the processor word size. This allows a single processor I/O operation to accomplish the wide register access, thereby reducing the register access overhead from the processor, allowing improved effective ALU speed. The foregoing and other objects, features and advantages of the invention will become more readily apparent from the following detailed description of a preferred embodiment of the invention which proceeds with reference to the accompanying drawings.

Figure 3:
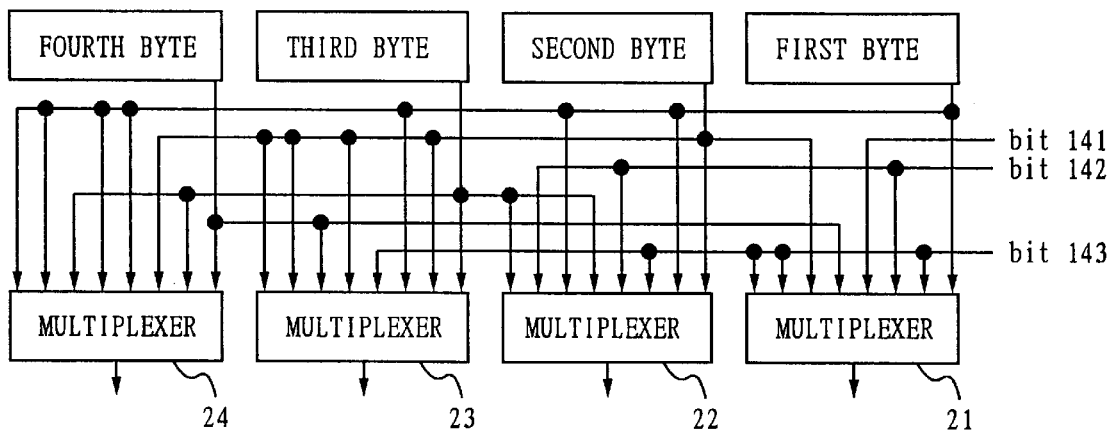
FIG. 3 is a block diagram illustrating the endian of FIG. 1 in greater detail.

Table 1 also illustrates the endian logic of FIG. 3.

DETAILED DESCRIPTION OF THE PREFERRED EMBODIMENT

Figure 1:
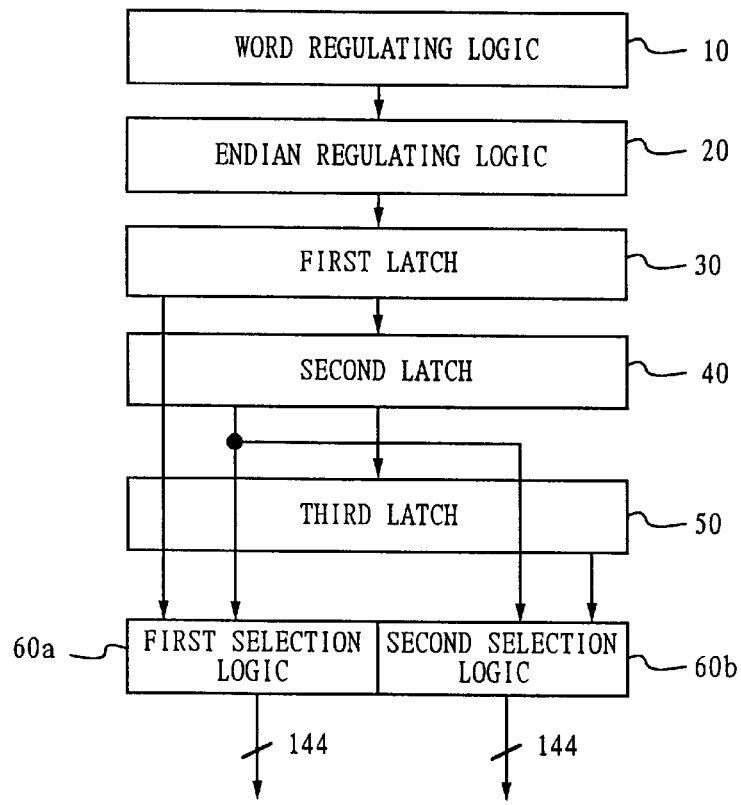
FIG. 1 is a block diagram of a vector data buffer according to the present invention.

In a presently preferred embodiment, as illustrated in FIG. 1, a vector data buffer according to the present invention includes a word buffer logic 10 which receives an input word, for example, a 144-bit word from the data bus (not shown). The word buffer logic controllably rotates the input data on a word basis, as will be further described below with reference to FIG. 2. In this example, for purposes of illustration, the input data is assumed to be 144 bits wide. The internal word size is 36 bits, and the register width is 288 bits. The rotated data provided by the word buffer logic 10 is output to endian buffer logic 20. The endian buffer logic and its operation are described in detail below with reference to FIG. 3. The endian logic, in turn, outputs the resulting data to a first latch 30. The first latch 30 in turn is coupled to second latch 40 and to first selection logic 60a further described below. This allows the selection logic 60a to select data from either the first latch or the second latch 40. The second latch 40 in turn is coupled to both first selection logic 60a and to a third latch 50. The second selection logic 60b is coupled to select data from either the second latch 40 or a third latch 50, as further described later with respect to FIG. 4. The outputs of the first and second selection logic 60a, 60b are coupled to the 288-bit wide register.

Figure 2:
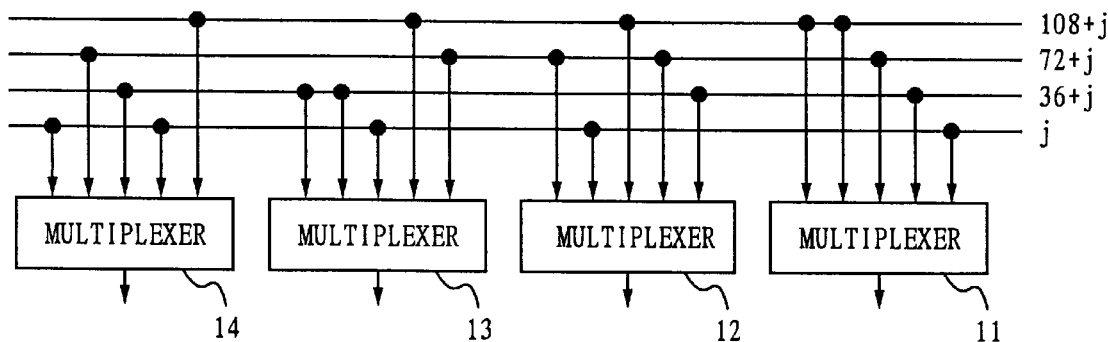
FIG. 2 is a schematic diagram illustrating the word buffer logic of FIG. 1 in greater detail.

Referring now to FIG. 2, the word buffer 10 logic is shown in greater detail. The word buffer logic 10 comprises multiplexers 11, 12, 13 and 14. Each of the multiplexers has at least 5 inputs. In this example, each of the multiplexer inputs is a 36-bit wide word. Thus, each multiplexer 11–14 selects one of five 36-bit words and provides the selected word at the corresponding output.

Each of the multiplexers 11–14 is controlled by three control bits. Decoding for the control bits is shown in the table in FIG. 2 below the logic diagram. For control input 000, each multiplexer selects the first input to the multiplexer (counting from right to left). It can be observed that in this case there is no rotation of the word sequence. Thus, the first multiplexer 11 outputs the first j-bits of the bus; the second multiplexer 12 outputs the next 36 bits; the third multiplexer selects the third most significant 36 bits; and the last multiplexer 14 selects the most significant 36 bits from the bus.

In the case where the control bits are equal to 001, a one-word rotation is effected in the word buffer logic. Thus, in this case, the first multiplexer 11 outputs or selects the second most significant 36 bits of the bus ("36+j"); the second multiplexer 12 selects the next most significant 36 bits ("72+j"); the third multiplexer 13 selects the most significant 36 bits of the bus; and finally, the fourth multiplexer 14 selects the least significant 36 bits of the bus, thereby effecting a one-word rotation.

When the three control bits equal 010, a two-word rotation is carried out as illustrated in FIG. 2, and control bits 011 carry out a three-word rotation. Finally, as illustrated in FIG. 2, control bits equal 100 can be used for reverse loading, so that the four words are selected in reverse order from most significant to least significant.

Referring now to FIG. 3, FIG. 3 shows the buffer logic 20 in greater detail. The endian buffer logic comprises multiplexers 21–24, each of which receives as inputs each of the first to fourth bytes (output from the multiplexers 11–14 of FIG. 2, respectively), and three bits (bits 141–143) of the word applied from the word buffer logic 10. The endian logic multiplexes the input bytes and bits of the applied word, as will be described, and outputs the multiplexed result into a first latch as shown in FIG. 1. Multiplexers 21–24 shift the input bytes or form endian words in response to the states of the applied three bits. In the illustrated embodiment, the specific byte shifting operations and endian word operations are shown in Table 1 as follows:

TABLE 1

| CONTROL BITS | MUX | | | | COMMENT |
|---|---|---|---|---|---|
| | 24 | 23 | 22 | 21 | |
| 000 | B4 | B3 | B2 | B1 | 0-byte shift |
| 001 | B3 | B2 | B1 | (143) | 1-byte shift |
| 010 | B2 | B1 | (143) | (142) | 2-byte shift |
| 011 | B1 | (143) | (142) | (141) | 3-byte shift |
| 100 | B1 | B2 | B3 | B4 | big endian word |
| 101 | B3 | B4 | B1 | B2 | big endian halfword |
| 110 | B1 | B2 | (142) | (143) | big endian halfword w/2-byte shift |
| 111 | B1 | B2 | B3 | (143) | big endian halfword w/reverse |

This Table based on FIG. 3

Figure 4:
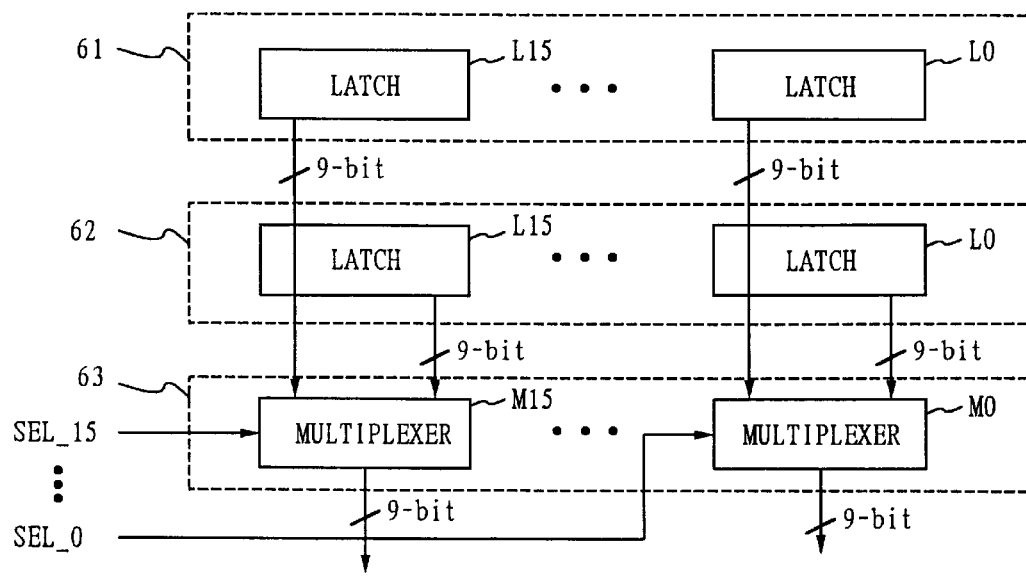
FIG. 4 is a schematic diagram illustrating the selection logic of FIG. 1 in greater detail.

Referring next to FIG. 4, the first and second selection logic 60a and 60b (see FIG. 1) each comprise the hardware illustrated in FIG. 4. The apparatus in a preferred embodiment includes a first latch portion 61 consisting of a series of 16 latches (L0–L15) each 9-bits wide. A second latch portion 62 comprises a similar series of 16 latches, (L0–L15) again with each latch being 9-bits wide in the illustrated embodiment. A multiplexer section 63 consists of a series of 16 multiplexers, labeled M0–M15. Each of the multiplexers M0–M15 selects one at a time of a first 9-bit input from a corresponding one of the latches in the first latch portion 61 or the second latch portion 62, and provides the selected 9-bit quantity of the corresponding output. Each of the multiplexers M0–M15 is controlled by a corresponding one of a series of 16 select input control signals (SEL0–SEL15, as shown).

Thus it can be seen that the multiplexers select data from either of the two latch portions.

Juxtaposing FIGS. 1 and 4, it can now be observed that in the case of the first selection logic 60a of FIG. 1, the first latch portion 61 of FIG. 4, corresponds to the first latch 30 and the second latch portion 62 of FIG. 4 corresponds to the second latch 40. Similarly, in the case of the second selection logic 60b of FIG. 1, the first latch portion 61 of FIG. 4 corresponds to the second latch 40 of FIG. 1, and the second latch portion 62 of FIG. 4 corresponds to the third latch 50 of FIG. 1.

OPERATION

It may be observed that the methods and apparatus described are particularly advantageous in connection with vector data processing, although they are not so limited. In general, the word buffer logic 10 provides for controllably rotating input data, for example, from a bus, into a desired word order, and includes reverse loading. The rotated word provided by the word buffer logic 10 is input to the endian buffer logic 20. In the endian logic buffer 20, each of the multiplexers, 21–24 receives each of the first to fourth bytes and three bits of the word applied from the word buffer logic 10, multiplexes the input bytes and bits of the word, and outputs the multiplexed result. These multiplexers shift the byte or formulate the endian word according to the state of the applied three bits as shown in Table 1.

Then, the first latch 30 latches the word provided from the endian buffer logic 20 and further outputs the latched word to the second latch 40 and to the first selection logic 60a as shown in FIG. 1. The second latch 40 latches the word applied from the first latch 30 and outputs the latched word to the first and second selection logic circuits 60a and 60b. Finally, the third latch 50 latches the word applied from the second latch 40 and outputs the latched word to the second selection logic 60b. Accordingly, the selection logic selectively outputs one of the words applied from the latches as mentioned previously. The multiplexers M0–M15 of the multiplexer portion 63 selectively output two 9-bit bytes in response to the select input signals.

Thus, the apparatus shown and described can be used to arrange the input words and bytes into an appropriate vector sequence for storage in a register. The bytes can be sequentially shifted into the register under control of the select input signals (SEL0–SEL15). So, for example, the first and second selection logic can be used in tandem to form the 288-bit wide register word. However, as shown in FIG. 4, the 16 select signals provide individual control of the multiplexers M0–M15 thereby providing 9-bit granularity for shift in individual bytes in the register in any desired vector sequence. In this way, the methods and apparatus of the present invention provide for moving data into and from a register with a minimum of I/O cycles of the ALU. In fact, a single input/output operation of the processor can be used even though the register is wider than the processor word size. The described invention effects all of the necessary shifting, rotation, and endian formation for vector processing, thereby substantially relieving the processor of that overhead, with the consequent improvements in processing speed.

Having described and illustrated the principles of the invention in a preferred embodiment thereof, it should be apparent that the invention can be modified in arrangement and detail without departing from such principles. I claim all modifications and variation coming within the spirit and scope of the following claims. For example, the present invention could be implemented in various combinations of conventional logic, programmable logic, embedded microprocessor core, etc.

I claim:

1. A system for packing a stream of input data into an output buffer, wherein the input data bit size is less than or equal to the output buffer bit size, the output buffer comprising an upper half and a lower half, the system comprising:

word regulating logic for rotating or reversing the words of the input data, and outputting a word result;

endian regulating logic for byte-shifting or arranging the endian format of the bytes of each word in the word result, and outputting an endian result;

a first means of holding data, holding the most recent endian result for storage into the upper half of the output buffer;

a second means of holding data, holding the second most recent endian result for storage into the upper half of the output buffer, the lower half of the output buffer or partial storage into both the upper half of the output buffer and the lower half of the output buffer;

a third means of holding data, holding the third most recent endian result for storage into the lower half of the output buffer;

a first means of selection for selecting bytes from the first holding means or the second holding means or both the first and second holding means to write to the upper half of the output buffer;

a second means of selection for selecting bytes from the second holding means or the third holding means or both the second and third holding means to write to the lower half of the output buffer.

2. A system according to claim 1, wherein the word regulating logic comprises a series of multiplexers, one multiplexer for every word in the input data, for selecting from the words of the input data to rotate or reverse words of the input data to form a word result.

3. A system according to claim 1, wherein the endian regulating logic comprises a series of multiplexers, one multiplexer for each byte of every word in the word result, for selecting from the words of the word result and control input signals to byte shift or change the endian format of the word result to form a endian result.

4. A system according to claim 1, wherein the first holding means, the second holding means and the third holding means comprise latches.

5. A system according to claim 1, wherein the first selection means comprises:

a first latch portion comprising a plurality of latches for selecting bytes from the first holding means;

a second latch portion comprising a plurality of latches for selecting bytes from the second holding means;

a multiplexer portion comprising a plurality of multiplexers for selecting between the corresponding latch in the first latch portion and the corresponding latch in the second latch portion and outputting the selection to the upper half of the output buffer.

6. A system according to claim 1, wherein the second selection means comprises:

a first latch portion comprising a plurality of latches for selecting bytes from the second holding means;

a second latch portion comprising a plurality of latches for selecting bytes from the third holding means;

a multiplexer portion comprising a plurality of multiplexers for selecting between the corresponding latch in the first latch portion and the corresponding latch in the second latch portion and outputting the selection to the lower half of the output buffer.

7. A method of packing streamed input data into an output buffer comprising the steps:

reading input data off of an input stream;

rearranging the words of the input data to position them for the most efficient storage within the output buffer and outputting a word result;

rearranging the bytes of the word result to position them in the desired format of the output buffer and outputting an endian result;

holding a series of the most recent endian results;

selecting from the series of most recent endian results corresponding bytes to write to the output buffer to effeciently pack the series of endian results into the output buffer.

8. A method of packing streamed input data into an output buffer comprising the steps:

reading input data off of an input stream;

rearranging the words of the input data to position them for the most efficient storage within the output buffer;

rearranging the bytes of the input data to position them in the desired format of the output buffer;

storing the input data into a first holding buffer and thereby advancing the data formerly in the first holding buffer into the second holding buffer and thereby advancing the data formerly in the second holding buffer into the third holding buffer;

repeating the steps of reading, rearranging the words, rearranging the bytes and storing until the input data originally stored in the first holding buffer advances to the second holding buffer;

selecting the contents of each byte of the lower half of the output buffer from the corresponding byte of the first holding buffer and the corresponding byte of the second holding buffer;

selecting the contents of each byte of the upper half of the output buffer from the corresponding byte of the second holding buffer and the corresponding byte of the third holding buffer.

9. A method according to claim 8, wherein the step of rearranging the words comprises rotating the words.

10. A method according to claim 8, wherein the step of rearranging the words comprises reverse loading the words.

11. A method according to claim 8, wherein the step of rearranging the bytes comprises byte shifting the bytes.

12. A method according to claim 8, wherein the step of rearranging the bytes comprises rearranging the endian format of the bytes.

13. A vector data buffer for a digital processor comprising:

word buffer logic for arranging input data into a selected sequence of words and outputting a result;

endian buffer logic for receiving the result of the word buffer logic and arranging the result by byte shifting and/or endian formation of the result to form an endian word in response to control input signals;

a first latch for latching the endian word applied from the endian buffer logic and outputting a first latched word;

a second latch for latching the first latched word applied from the first latch and outputting a second latched word;

a third latch for latching the second latched word applied from the second latch and outputting a third latched word;

a first selection logic for selectively outputting one of the words applied from the first and second latches to a register; and a second selection logic for selectively outputting one or the words applied from the second and third latches to the register.

* * * * *

UNITED STATES PATENT AND TRADEMARK OFFICE
CERTIFICATE OF CORRECTION

PATENT NO.    : 5,903,779
DATED         : May 11, 1999
INVENTOR(S)   : Park

Page 1 of 1

It is certified that error appears in the above-identified patent and that said Letters Patent is hereby corrected as shown below:

<u>Column 6,</u>
Line 42, "a result" should read -- the result --.

Signed and Sealed this

Nineteenth Day of March, 2002

Attest:

JAMES E. ROGAN
*Director of the United States Patent and Trademark Office*

*Attesting Officer*